United States Patent [19]

Cohen et al.

[11] Patent Number: 5,122,648
[45] Date of Patent: Jun. 16, 1992

[54] APPARATUS AND METHOD FOR AUTOMATICALLY FOCUSING AN INTERFERENCE MICROSCOPE

[75] Inventors: Donald K. Cohen; James D. Ayres; Eugene R. Cochran, all of Tucson, Ariz.

[73] Assignee: Wyko Corporation, Tucson, Ariz.

[21] Appl. No.: 531,884

[22] Filed: Jun. 1, 1990

[51] Int. Cl.$^5$ ............................................. H01J 40/00
[52] U.S. Cl. .................................. 250/201.3; 250/550; 250/201.2; 356/357; 356/358; 356/359; 350/510; 359/371
[58] Field of Search ............... 250/201.2, 201.3, 550; 350/509-510; 356/359, 357, 358

[56] References Cited

U.S. PATENT DOCUMENTS

| | | | |
|---|---|---|---|
| 3,798,449 | 3/1974 | Reinheimer et al. | 250/201 |
| 4,056,323 | 11/1977 | Ludman | 356/106 |
| 4,207,461 | 6/1980 | Wilwerding | 250/201 |
| 4,333,007 | 6/1982 | Langlais et al. | 250/201 |
| 4,385,839 | 5/1983 | Westell | 356/400 |
| 4,447,717 | 5/1984 | Nohda | 250/201 |
| 4,577,095 | 3/1986 | Watanabe | 250/201 |
| 4,584,484 | 4/1986 | Hutchin | 250/550 |
| 4,600,832 | 7/1986 | Grund | 250/201 |
| 4,609,814 | 9/1986 | Nobuaki et al. | 250/201 |
| 4,620,089 | 10/1986 | Schlichting et al. | 250/201 |
| 4,636,078 | 1/1987 | Podvin | 356/359 |
| 4,661,692 | 4/1987 | Kawasaki | 250/201 |
| 4,687,913 | 8/1987 | Chaban | 250/201 |
| 4,931,630 | 6/1990 | Cohen et al. | 250/201.3 |

Primary Examiner—David C. Nelms
Assistant Examiner—T. Davenport
Attorney, Agent, or Firm—Cahill, Sutton & Thomas

[57] ABSTRACT

Automatic focusing of an interference microscope is accomplished by directly sensing an interference pattern produced by a white light source with an auxiliary point detector. A beamsplitter intercepts part of the interference beam and directs it to the point detector. A narrow band filter filters light passing through the beam splitter on its way to a main detector array. An objective of the interference microscope is rapidly moved to an initial position between a sample surface and a fringe window by operating a position sensor to sense when the objective is a predetermined safe distance from the sample surface and turning off a motor moving the objective. The objective then moves rapidly from the initial position until the presence of fringes is detected by the point detector. Momentum of the microscope causes the objective to overshoot beyond a fringe window. The microscope objective then is moved more slowly through the interference window until fringes again are detected; the lower speed results in substantially reduced overshoot. Intensity measurements from the detector are sensed and stored as the objective moves through the width of the fringe window. The microscope objective then is yet more slowly moved through the fringe window while sensing the intensities produced by the point detector until the objective reaches a point at which the intensity is equal to a preselected percentage of the maximum stored intensity.

10 Claims, 4 Drawing Sheets

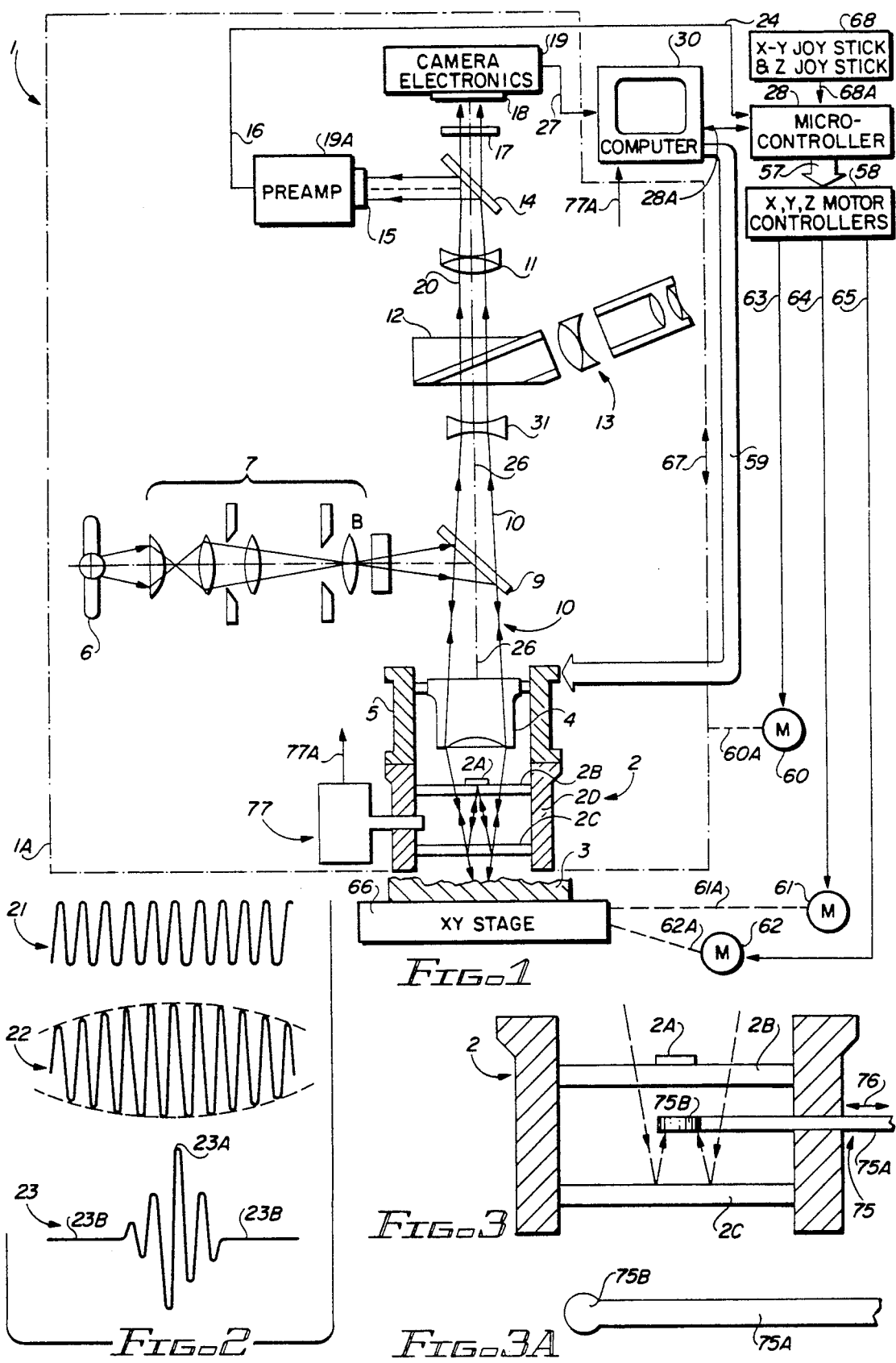

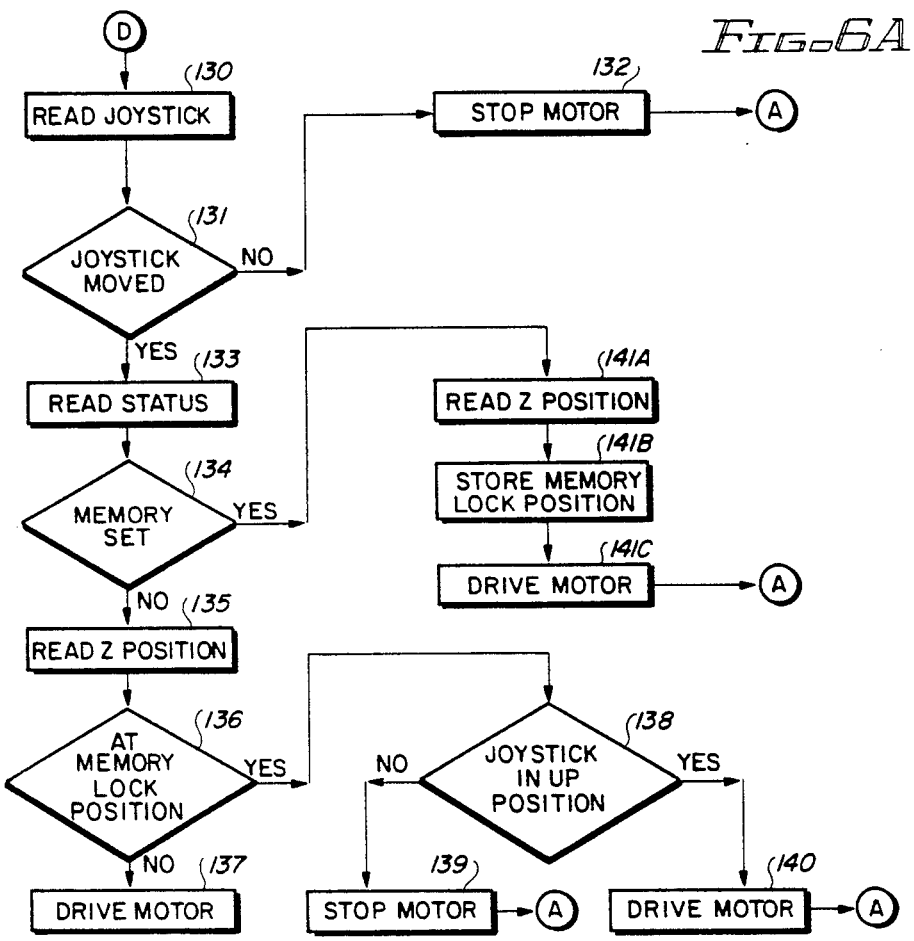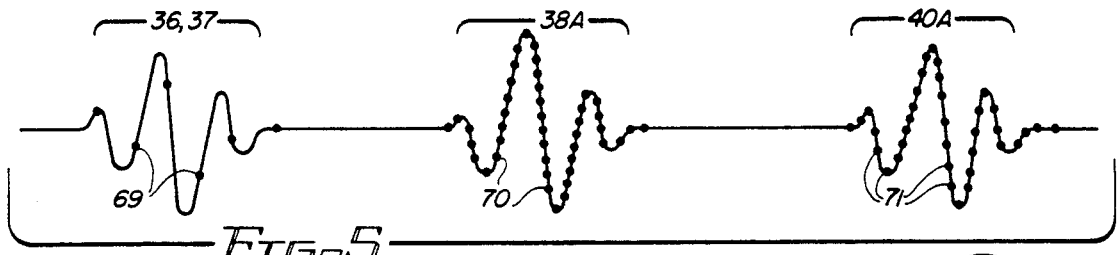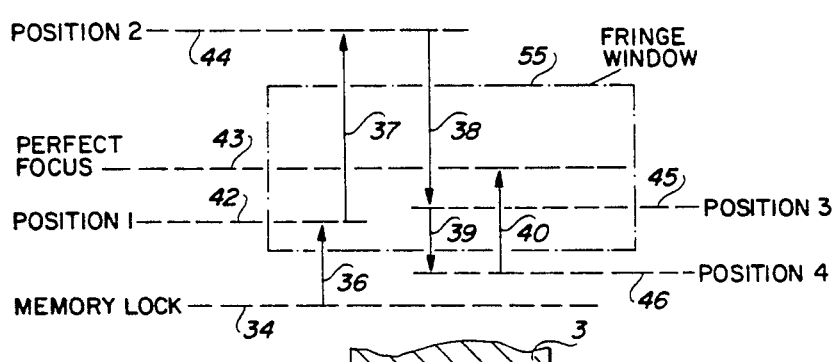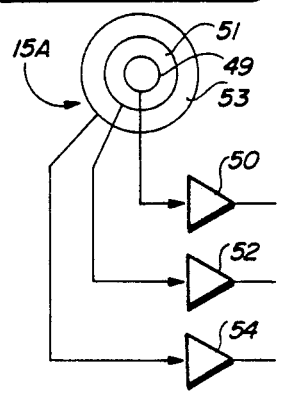

APPARATUS AND METHOD FOR AUTOMATICALLY FOCUSING AN INTERFERENCE MICROSCOPE

CROSS REFERENCE TO RELATED APPLICATION

This application is a continuation-in-part of commonly assigned co-pending application "APPARATUS AND METHOD FOR AUTOMATICALLY FOCUSING AN INTERFERENCE MICROSCOPE", Ser. No. 07/333,182, filed Apr. 4, 1989, now U.S. Pat. No. 4,931,630 issued Jun. 5, 1990, and incorporated herein by reference.

BACKGROUND OF THE INVENTION

The invention relates to automatic focusing systems for microscopes, especially interference microscopes, and more particularly to automatic focusing systems which directly detect the presence of interference fringes to determine the degree of focus of the optical system.

In a typical interference microscope, light from a source, typically a laser, is split by appropriate means to travel down a reference path and a sample path. The reference path and sample path differ in that the reference path is focused on a reflective reference mirror and the sample path is focused on the sample to be measured. Light reflected from the reference mirror and light reflected from the sample interfere to create an interference pattern which is detected by a photodetector array. The resulting signals are analyzed using various well known interferometric techniques to determine the topography of the sample surface. Accurate data can be obtained from an interference microscope only if the "focus error" is minimal.

All presently known interference microscopes are manually "randomly" focused by a human operator who must adjust the axial position of the interference microscope objective until a sample surface visually appears to be "in focus". Unfortunately, the interference pattern is only present over a narrow axial range, typically a few microns, near the "ideal" focus range of the microscope objective relative to the sample surface. This makes it difficult to focus an interference microscope.

This narrow axial range where fringes are visible is very difficult for a human operator to detect as he or she "adjusts" the microscope objective through the focus range of the microscope, due to limitations in the sampling rate of the average human eye. Furthermore, human reflex rate limitations limit the ability to stop movement of the microscope objective once visual observation of interference fringes has occurred. This is especially true for low power microscope objectives. For low power microscope objectives, the depth of focus is so large that images which appear to the human eye to be well focused in fact may not be accurately focused. That is, when considering an interference microscope for lower magnifications, the test surface may appear to be in focus to the eye of the observer over a fairly large range of movement of the microscope objective, but the fringe pattern will be visible only within an axial range of a few microns.

It sometimes requires a human operator a long time (e.g., many minutes) to achieve accurate focusing of a typical interference microscope being utilized to observe the surface of a typical sample. After the interference microscope is finally focused, then disturbing it, for example to insert or remove a filter, or to cause lateral movement of an X-Y stage to observe an adjacent area of the sample surface, often results in loss of focus. The operator therefore may need to refocus each observed area of the sample. It is not an uncommon occurrence for a manual focusing adjustment by a relatively inexperienced operator to result in "crashing" the microscope objective into the sample surface, possibly destroying both.

Many automatic focusing devices for various optical systems are known. Most, such as the automatic focusing devices disclosed in U.S. Pat. Nos. 4,600,832, 4,333,007, 4,385,839, 3,798,449, and 4,207,461, require that discernable features of the sample be present. The contrast of the images of such features is utilized utilize auxiliary optical sources and additional apertures to obtain focus information. One reference, U.S. Pat. No. 4,620,089, uses an interference pattern that is present when the object is in focus. This system requires differential sensing of the interference pattern by means of two optical paths and two detectors.

Another prior art technique involves sensing focus error. Focus error sensing techniques usually require using a laser as the light source.

There clearly is an unmet need for an automatic focusing apparatus for an optical system, especially for an interference microscope, that avoids the large amount of time often required for manual focusing of interference microscopes. There also is an unmet need for an automatic focusing system, especially for an interference microscope, which can accurately and repeatedly focus the optical system or interference microscope to thereby eliminate human focusing errors which are inherent in present manual focusing techniques.

SUMMARY OF THE INVENTION

Accordingly, it is an object of the invention to reduce the time needed to focus an optical system using manual focusing techniques.

It is another object of the invention to eliminate focusing errors inherent in present manual techniques for focusing interference microscopes.

It is another object of the invention to avoid the need to manually refocus an interference microscope between measurements of adjacent areas of the same sample surface.

It is another object of the invention to provide an economical, simple apparatus and technique for automation of surface topography measurements of a large number of areas of a sample surface using an interference microscope.

Briefly described, and in accordance with one embodiment thereof, the invention provides a system and technique for automatically focusing an optical system by rapidly moving an objective of the optical system to a position between a sample surface and a fringe window at a first speed by operating a position sensor to sense when the objective is a predetermined distance from the sample surface and turning off a motor moving the objective, illuminating the sample surface with a broad band beam from a light source through an interferometer, splitting off a part of a resulting interference beam, moving the objective away from the sample surface at a second speed, sensing intensities of the split part of the interference beam by means of a first detector, stopping movement of the objective in response to sensing of a change in a variable which is a function of sensed intensities from the first detector representing presence of fringes in the interference beam, moving the objective in the fringe window at a third speed, sensing intensities of the split part of the interference beam by means of the first detector and recording values of the variable being produced in response to the first detector, determining and storing a maximum value of the variable, moving the objective in the fringe window at a fourth speed, sensing intensities of signals being produced by the first detector, comparing corresponding values of the variable to the stored maximum value, and stopping the objective in response to the comparing when a value of the variable being produced by the first detector is equal to a preselected percentage of the maximum value. In the described embodiment, the second speed causes the objective to coast or overshoot beyond the fringe window. The third speed is substantially less than the second speed, so overshooting of the objective at the third speed is much less than at the second speed and a substantially larger number of intensities produced by the first detector are sampled. The fourth speed is substantially less than the third speed, and overshooting of the objective for the corresponding transition is minimal. In the described embodiment, the optical system includes an interference microscope. A portion of the interference beam is directed to a CCD camera which, in conjunction with suitable scanning and analog-to-digital conversion circuitry, inputs a digital representation of the fringe pattern corresponding to the sample surface into a computer which performs an interferometric analysis thereon. In one embodiment a retractable element is inserted in the interferometer to prevent light from reaching the reference mirror of the interferometer.

BRIEF DESCRIPTION OF THE DRAWINGS

FIG. 1 is a diagram of an interference microscope including the automatic focusing system of the present invention.

FIG. 2 is a diagram showing output signals produced by the point detector in FIG. 1 for different light sources.

FIG. 3 is a diagram of a modified Mirau interferometer including a retractable element to prevent light from reaching the reference mirror to allow the interference microscope of FIG. 1 to be used as an ordinary microscope with automatic focusing capability.

FIG. 3A is a plan view diagram of the retractable light blocking element in FIG. 3.

FIG. 4 is a diagram useful in describing a sequence of operations during the coarse focus and fine focus procedures of the present invention.

FIG. 5 is an expanded waveform of the point detector output signal during the procedure explained with reference to FIG. 4.

FIGS. 6 and 6A constitute a flowchart of the program executed by the processor in FIG. 1 to carry out the coarse focusing and fine focusing procedures of the invention.

FIG. 7 is a diagram of a point detector having a selectable effective diameter.

DETAILED DESCRIPTION OF THE PREFERRED EMBODIMENTS

Figure 1A:
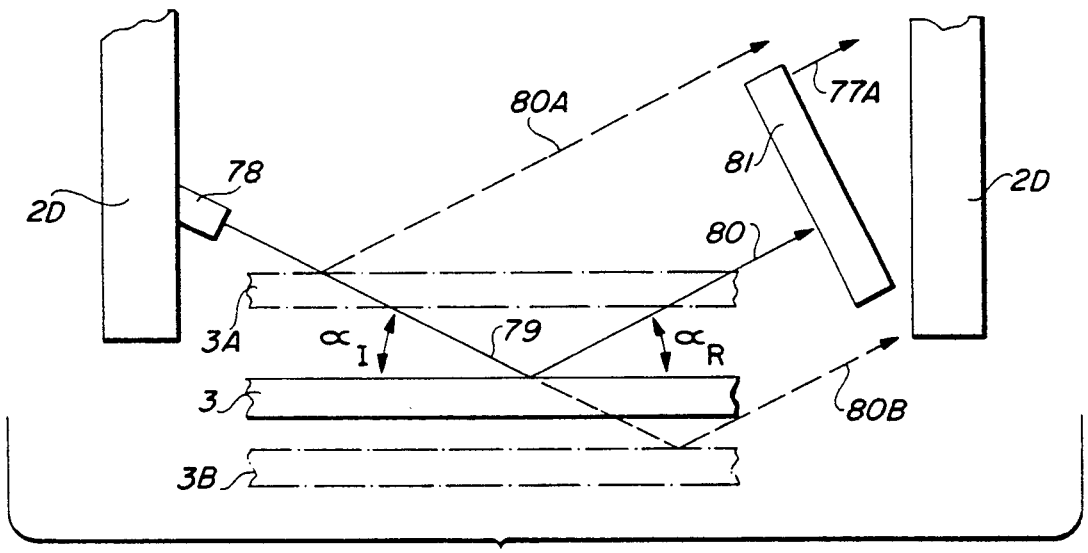
FIG. 1A is a diagram illustrating a preferred embodiment of the sample proximity sensor included in FIG. 1.

Referring to FIG. 1, automatic focusing interference microscope 1 includes a Mirau interferometer 2 having a reference mirror 2A on a glass plate 2B, and a beamsplitter 2C. A microscope objective 4 is supported above a test surface 3 by a piezoelectric transducer (PZT) 5. PZT 5 is supported by a frame 2D of Mirau interferometer 2. Mirau interferometer 2 is supported by the frame of microscope section 1A. The vertical or Z position of microscope section 1A is controlled by a motor 60, which is connected by a mechanical link 60A to microscope section 1A. Test surface 3 is supported on an X-Y stage 66. Movement of X-Y stage 66 in the X direction is controlled by motor 61, which is connected by a mechanical link 61A to X-Y stage 66. Movement of X-Y stage 66 in the Y direction is controlled by motor 62, which is connected by a mechanical link 62A to X-Y stage 66. The position of microscope objective 4 is precisely controlled by PZT 5 in response to three PZT driver signals 59 produced by computer 30. Motors 60, 61, and 62 are controlled by signals 63, 64, and 65, respectively, produced by motor controller circuitry 58.

A white light source, which can be a typical quartz halogen lamp, directs white light through a typical commercially available illumination assembly 7, which directs the white light beam onto an ordinary beamsplitter 9. Beamsplitter 9 reflects the white light beam 10 into the upper end of microscope objective 4.

The beams reflected from the reference mirror 2A and the sample surface 3 then pass back up through microscope objective 4, upward through beamsplitter 9, through a collimating lens 31, and through a multilayer-coated beamsplitter 12 which deflects approximately 30 percent of the interference beam 20 into eyepiece assembly 13. Most of the interference beam 20 continues upward through imaging lens 11 to beamsplitter 14. Part of the interference beam 20 is reflected by beamsplitter 14 onto a fast (compared to the human eye or a CCD array) point detector 15, which is connected to a preamplifier 19A. In the prototype embodiment constructed, point detector 15 is a single photodiode. The output of preamplifier 19A is connected by signal conductor 16 to the microcontroller 28. Microcontroller 28 can be an Intel 8098. Block 68 includes an X-Y "joystick controller" and a Z joystick controller by means of which an operator can manually control motors 60, 61, and 62 to control the lateral position of X-Y stage and the vertical position of microscope section 1A relative to sample surface 3, and is connected by suitable conductors 68A to inputs of microcontroller 28. Microcontroller 28 communicates by bi-directional bus 28A with computer 30, which can be a Hewlett-Packard 330 desk-top computer in combination with a commercially available WYKO PMI (Phase Measuring Interface). Microcontroller 28 generates outputs 57 which control motor controller circuitry 58. Microcontroller 28 and motor controller circuitry 58 actually are included in the above WYKO PMI unit.

Microcontroller 28 monitors position feedback information from motors 60, 61, and 62 and also monitors the intensity signals on conductor 16 to control positioning of microscope section 1A by Z axis motor 60 and the positioning of stage 66 by X and Y axis motors 61 and 62. During normal operation (i.e., manual operation), microcontroller 28 continually checks to determine if an autofocus command has been initiated by depressing an "autofocus" button (not shown). If no such command has been received. microcontroller 28 updates and reacts to the joystick and motor position inputs every 600 microseconds by appropriately controlling Z axis motor 60. The Z axis motor 60 is disabled whenever an autofocus command is received by microcontroller 28. It should be noted that the autofocus command can be initiated either by pressing the autofocus button on the Z joystick in block 68 or it can be initiated by the computer 30. Once a focus command has been received, microcontroller 28 stops updating the joystick status and begins updating the intensity measurements from conductor 16 and the Z motor position feedback information. This operation continues until the focusing of microscope 1 has been accomplished, as subsequently explained.

In response to the autofocus command, microcontroller 28 first checks to determine if interference microscope 1 is already "in focus". This is accomplished by slowly moving microscope section 1A along Z axis 26 and monitoring the sensed intensities for large variations that indicate the presence of fringes. If the presence of fringes is detected, microcontroller 28 continues movement of microscope section 1A through a fringe window 55 (FIG. 4) and then stops. Once the microscope objective has passed through fringe window 55, the microcontroller 28 increases its update interrupt rate to once every 200 microseconds.

While updating the intensities received on conductor 16 every 200 microseconds, microcontroller 28 causes the microscope section 1A to pass back through fringe window 55 very slowly and measures an "amplitude profile" of the sample surface 3 through the entire width of fringe window 55, updating the maximum measured intensity as objective 4 moves through the fringe window. Once the amplitude profile of the sample surface 3 and the fringe window has been obtained, microcontroller 28 moves the microscope objective 4 back through the fringe window again, continually sampling the intensities on conductor 16 until the measured intensity reaches approximately 99 percent of the maximum intensity previously obtained. Microscope 1 then is focused, and microcontroller 28 returns to the above described manual mode of operation until the autofocus button is again depressed.

If the microscope objective 4 is not initially within fringe window 55, microcontroller 28 instead executes a coarse focus algorithm. During the coarse focus algorithm, microcontroller 28 updates the Z axis motor position and the intensity information on conductor 16 every 600 microseconds, while microcontroller 28 rapidly moves the microscope section 1A down to the memory lock location 34 of FIG. 4. Then microcontroller 28 samples the intensity signal on conductor 16 once every 200 microseconds while it moves microscope section 1A up at the maximum rate at which presence of fringes can be reliably detected, and continues until large amplitude variations in the intensity signal on conductor 16 indicates presence of fringes. Then the fine focusing technique described above is performed.

A narrow bandpass filter 17 is positioned between beamsplitter 14 and a camera including a CCD (Charge Coupled Device) array 18 and camera scanning electronics 19. A portion of the interference beam 20 passing through beamsplitter 14 also passes through filter 17 before impinging on CCD detector array 18. The signals produced by detector array 18 represent the profile of sample surface 3, and are scanned by camera scanning electronics in block 19, which produce amplified signals 27 that are digitized and input to computer 30 for suitable processing in accordance with the needs of the user.

The reference path and sample path in Mirau interferometer 2 are essentially identical except that the reference path is focused on mirror or reference surface 2 and the sample path is focused on the test surface 3. Numeral 26 designates the vertical axis of interference microscope 1.

The diameter of the point detector needs to be sufficiently small that its output signal is heavily influenced by either the presence or absence of a fringe of the interference pattern.

The waveforms shown in FIG. 2 represent waveforms produced on conductor 16 from the point detector 15 in response to different sources as the microscope moves through its focus range. Waveform 21 shows the point detector output for the laser source (with less than 1 nanometer spectral bandwidth). This waveform has essentially no envelope. Waveform 22 shows the output of point detector 15 as a function of microscope objective position for a filtered white light source with 40 nanometers spectral bandwidth. The peak points of waveform 22 represent the ideal focus position of the microscope objective 4. Finally, waveform 23 shows the output of point detector 15 as a function of microscope objective position if light source 6 is a white light source. It is seen that this response is very peaked, and identification of the ideal microscope objective focus point is much more distinct than for waveforms 21 or 22. Since for a narrow band source such as the laser the signal modulation envelope is very broadband, and ideal focus is not easily achieved, and the described embodiments of the invention operate best for broad band spectral sources in which the peak signal is clearly indicative of best focus.

The image formed by a properly focused interference microscope typically consists of a pattern of light and dark alternating interference fringes. The number of fringes in the orientation of the fringes across the image plane are dependent on the relative tilt between the sample surface and the reference surface. Interference microscopes are assembled such that the brightest fringe occurs at "best focus", i.e., within the depth of focus of the microscope objective.

Referring to FIGS. 4 and 5, the first step in operating the automatic focusing microscope 1 after test sample 3 has been positioned for a measurement is to "manually" move (i.e., by means of the Z joystick in block 68) the microscope objective 4 to a location that is known to be closer to the surface of sample 3 than the ideal focus point. More specifically, the operator sets and stores a position in the memory of microcontroller 28 referred to as the "memory lock position" by manually moving microscope objective 4 closer to sample 3 than the known focus distance and activating a "set memory lock" button (not shown).

The next step is to press an "autofocus" button (not shown). Briefly, the first step in the procedure is to determine if the microscope is already at the best focus position. If it is not, a coarse focus procedure is initiated to first move the microscope objective rapidly until the presence of interference fringes is detected. Then a fine focus procedure is initiated to slowly, precisely locate the microscope objective at the best focus position.

If the microscope objective 4 is not within the "fringe window" 55 (FIG. 4), the microcontroller 28 drives the Z axis motor 60 at a "fast down" speed (i.e., roughly 2500 microns per second) to move the microscope section 1A to the memory lock position 34. Next, the coarse focus routine executed by the microcontroller 28 generates signals that move the microscope section 1A (which is quite massive and has a large momentum) at a speed of approximately 13 percent of the "fast down" speed, as indicated by arrow 36 in FIG. 4. This transition 36 continues until microcontroller 28 detects the presence of the interference pattern by recognizing that the signal on conductor 16 is varying sinusoidally, as in region 23A of FIG. 2 rather than monotonically as indicated by numeral 23B in waveform 23. (If the presence of interference fringes is not detected within a preselected time period, the procedure is halted and the coarse focus procedure is attempted again, and generates an error signal if fringes are not detected.)

When a sinusoidal output is detected from point detector 15, the microscope objective 4 then is known to be in the fringe window 55. Microcontroller 28 generates a command that turns off the control signal 63 to Z axis motor 60 at "position 1", indicated by horizontal dotted line 42 in FIG. 4. The momentum of the microscope section 1A causes it to continue to "coast" upward, as indicated by transition arrow 37 in FIG. 4. Microscope section 1A "overshoots" fringe window 55, and comes to a stop at "position 2" designed by horizontal dotted line 44 in FIG. 4. If the momentum of microscope section 1A does not carry it above fringe window 55, microcontroller 28 takes over and causes transition 37 to continue to ensure that microscope section 1A does not stop until the objective 4 passes beyond fringe window 55.

Next, after a suitable pause, microcontroller 28 generates new values of control signal 63, reversing the direction of Z axis motor 60 and causing it to lower microscope section 1A at a "slow" speed which is approximately 0.7 percent of the "fast down" speed, as indicated by transition arrow 38 in FIG. 4. The downward transition 38 of microscope section 1A continues until fringes are detected (in the manner described above), which occurs at "position 3", designated by horizontal dotted line 45, and immediately turns off motor 60 at that point. The momentum of microscope section 1A and motor 60 cause microscope section 1A to continue to coast downward from dotted line 45, as indicated by transition arrow 39, to a resting point beyond the lower edge of fringe window 55, referred to as "position 4" and designated by horizontal dotted line 46. If the momentum of microscope section 1A does not carry microscope objective 4 beyond the lower edge of fringe window 55, microcontroller 28 takes over and causes Z axis motor 60 to carry it beyond fringe window 55. After a suitable pause at position 46, microcontroller 28 generates new signals 63 to again turn on motor 60 to raise microscope section 1A at the same speed as transition 38, causing microscope section 1A to undergo a very slow upward transition 40.

During transition 38 microcontroller 28 samples intensities of interference beam 20 sensed by point detector 15 at a relatively large number of Z axis locations (i.e., roughly every 0.1 microns), as indicated by points 70 in section 38A of the waveform in FIG. 5. The waveform in FIG. 5 represents the signal on conductor 16, and includes section 36,37 corresponding to transitions 36 and 37, section 38A corresponding to transition 38, section 40A corresponding to transition 40 in FIG. 4.

During transitions 38 and 39, microcontroller 28 continually updates the maximum intensity sensed on conductor 16 and stores it. After a suitable pause at level 46, microcontroller 28 then reverses Z axis motor 60, causing microscope section 1A to move upward, as indicated by transition arrow 40. During transition 40, microcontroller 28 continually samples the intensities of many points on section 40A of the waveform on conductor 16, as indicated in FIG. 5. The sample points on section 40A are designated by numeral 71 in FIG. 5. Microcontroller 28 compares each of these intensities to the maximum intensity stored during transition 38,39, and stops motor 60 when the intensity is equal to 99 percent of the maximum, at position 6 indicated by horizontal dotted line 48.

When motor 60 is stopped, microscope section 1A is moving so slowly that there is no appreciable overshoot. The 99 percent threshold level has been selected to account for electrical noise that might be present on the signals on conductor 16 and reduce the likelihood that the maximum intensity stored during transition 38,39 contains a large enough noise component that microcontroller 28 cannot find as large a peak in section 40A of the waveform of FIG. 5 as the noise-containing maximum intensity value previously stored during transition 38A.

Then CCD detector array 18 and camera electronics 19 and microcontroller 28 can suitably process the image filtered through red filter 17 and perform the necessary analysis on it. Next, the X-Y stage 66 supporting sample 3 is moved to an adjacent area of sample surface 3 and the above procedure is repeated.

Figure 6:
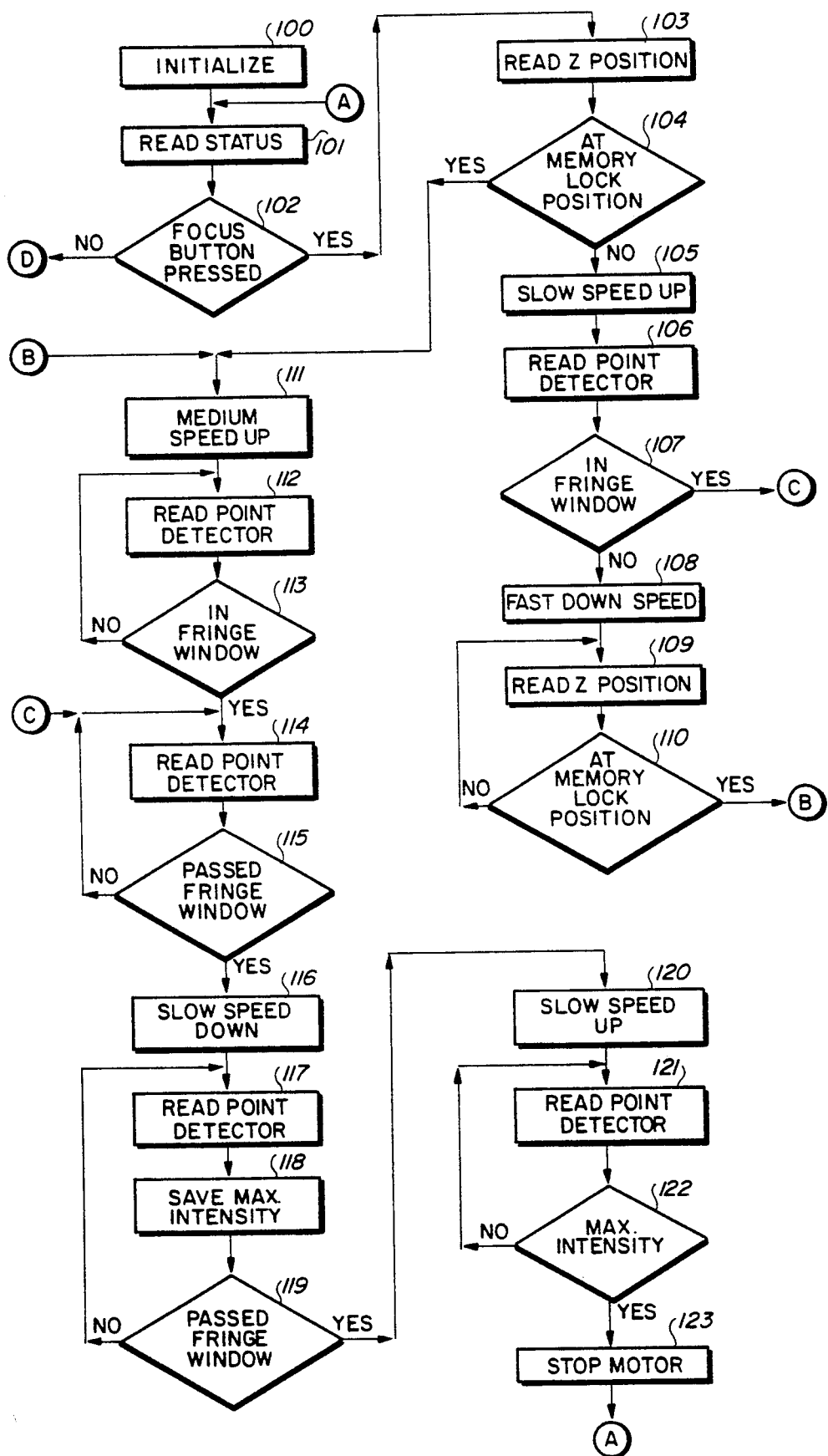

The flowchart of FIG. 6 shows in more detail the steps performed by microcontroller 28 to carry out the above described coarse focus and fine focus procedure.

Referring to FIG. 6, in block 100, microcontroller 28 performs various routine initialization functions, such as including setting the initial manual operating mode for the microscope. Initialization also includes the setting of values in various registers of microcontroller 28. In block 101, microcontroller 28 reads an 8 bit status register, and more particularly reads the present status of the autofocus button. Next, the program goes to decision block 102 and determines if the present state of the autofocus switch is on or off. If the autofocus switch is off, the program goes via label D to block 130 of FIG. 6A.

If the autofocus button has been depressed, the program goes to block 103 and reads the position of Z axis motor 60. The program then goes to decision block 104 and determines if the Z axis position of the microscope objective 4 is at the memory lock position. If this determination is negative, the program goes to block 105 and generates a signal on conductor 63 to cause the Z axis motor 60 to move up slowly from the present position. The program then goes to block 106 and reads the intensity produced by point detector 15, and then goes to decision block 107. In decision block 107, the program determines if the intensity variations indicate that the microscope objective 4 is within the fringe window 55. If this determination is affirmative, the program goes to label C. If the determination is negative, the program goes to block 108 and generates a signal on conductor 63 that causes Z axis motor 60 to move microscope section 1A downward at a "maximum" speed. The program then goes to block 109 and reads the Z axis position of microscope objective 4. The program then goes to decision block 110 and determines if the microscope objective 4 is at the memory lock position. If this determination is affirmative, the program goes to label B, but otherwise returns to the entry point of block 109.

If the determination of decision block 104 is affirmative, the program goes to block 111 and sets the Z axis motor speed to cause the microscope section 1A to move up at a "medium" speed which is approximately 13% of the maximum speed. The program then goes to decision block 112 and reads the intensity of the signal on conductor 16 presently being produced by point detector 15. The program then goes to decision block 113 and determines if microscope objective 4 is in the fringe window. If this determination is negative, the program returns to the entry point of block 112, but otherwise goes to block 114 and again reads the present intensity of the signal on conductor 16. The program then goes to decision block 115 and determines if microscope objective 4 has moved beyond fringe window 55. If this determination is negative, the program returns to the entry point of block 114, but otherwise goes to block 116 and sets the Z axis motor speed to cause the microscope section 1A to move downward at a "slow" rate which is approximately 0.07 percent of the maximum speed.

The program then goes to block 117, reads the intensity on conductor 16, goes to block 118 and, if necessary, updates the maximum intensity value being stored. The program then goes to decision block 119 and determines if microscope objective 4 has passed beyond fringe window 55. If this determination is negative, the program returns to the entry point of block 117, but otherwise goes to block 120 and sets the Z axis motor speed to cause the microscope section 1A to move up at a slow speed which is equal to the down speed set in block 116. The program then goes to block 121 and reads the present intensity on conductor 16, and then goes to decision block 122 and determines if the present intensity is equal to the previously stored maximum intensity value. If this determination is negative, the program returns to the entry point of block 121, but otherwise goes to block 123 and stops, finishing the autofocus mode and returning to the above described manual mode via label A.

If the decision in block 102 is that the autofocus button has not been depressed, the program goes to block 130 of FIG. 6A and reads the present state of the Z joystick, and then goes to decision block 131 and determines if the Z joystick has been moved from its "home" position. If this determination is negative, the program goes to block 132 and stops the drive signal to Z axis motor 60, and returns via label A to the entry point of block 101. Otherwise, the program goes to block 133 and reads the above-mentioned status byte. The program then goes to decision block 134 and determines if the "set memory" bit of the status byte is set, i.e., if the memory lock button has been depressed. If this determination is negative, the program goes to block 135 and reads the position of the microscope objective 4 along the Z axis. The program then goes to decision block 136 and determines if the microscope objective 4 is at the memory lock position, and if this determination is negative, the program goes to block 137 and controls the Z axis motor 60 in accordance with the Z joystick position. The program then returns via label A to block 101.

If the determination of decision block 136 is affirmative, the program goes to decision block 138 and determines if the Z joystick is in the "up" position. If this determination is negative, the program goes to block 139 and turns the Z axis motor 60 off, and then returns via label A to block 101. If the determination of decision block 138 is affirmative, the program goes to block 140 and outputs the correct voltage on conductor 63 to Z axis motor 60 in accordance with the previously read position of the Z joystick. The program then goes via label A to block 101.

If the determination of decision block 134 is affirmative, the program goes to block 141A and reads the position of microscope objective 4 along the Z axis, goes to block 141B and stores the memory lock position, and then goes to block 141C and outputs the joystick control information via conductor 61 to the Z axis motor, and returns via label A to block 101.

The above described procedure has assumed that simple intensities of signals produced by point detector 15 have been utilized as described. However, fringe modulation or fringe visibility can be utilized instead of maximum intensity to effectuate good focus in some cases.

If desired, the sensed intensities can be used to compute fringe modulation or fringe visibility as defined in the 2-beam interference equation as $\gamma$ in the equation $$I_{65} = I_0(1 + \gamma \cos \phi)$$

A rough approximation of the fringe modulation is obtained by translating the PZT 5 to which reference mirror 2A of the interference microscope is attached through a distance greater than 400 nm (nanometers), while the intensity is monitored using the point detector 15. The maximum and minimum intensities sensed during the PZT translation are recorded. The difference between these measurements is proportional to the fringe modulation, which is approximately equal to $$(I_{MAX} - I_{MIN})/(I_{MAX} + I_{MIN})$$

The algorithm for automatic focusing using fringe modulation is quite similar to the above described "intensity searching algorithm", except that maximum fringe modulation is searched for instead of maximum intensity produced by point detector 15.

Another algorithm, which also is similar to the intensity searching algorithm, except that the maximum difference over a set intensity window is searched for instead of a maximum intensity, can be used to effectuate automatic focusing. The maximum difference, or peak-to-valley (i.e., peak-to-peak) difference is defined as the maximum intensity value in the intensity window minus the minimum value in the intensity window. Yet another approach is to compute and search for maximum intensity slope change over a set intensity window, where intensity slope is defined as the difference between two intensity measurements, i.e., the rate of change in intensity measurements. The criterion for decision using this "slope searching algorithm" is the sum of the squares of the intensity slopes and a given size intensity window.

Referring to FIG. 7, an alternate embodiment of detector 15 is shown, and which numeral 49 designates a first small-area detector, which may be a single photodiode. Numeral 51 designates an array of additional photodiodes adjacent to and surrounding photodiode 49. Numeral 53 designates an even larger annular array of photodiodes surrounding area 51. The size of the detector 15A can be selected by simply selecting only photodiode 49, photodiode 49 and photodiode 51 or photodiodes 49, 51, and 53. Outputs of these three groups of photodiodes are routed by suitable conductors to scanning and amplifying circuits 50, 52, and 54, respectively.

It often may be desirable to use microscope 1 of FIG. 1 as an "ordinary" microscope instead of an interference microscope, but nevertheless retaining the automatic focusing capability thereof. This can be achieved by effectively removing or blocking reference mirror 2A in interferometer 2. FIG. 3 shows a modified Mirau interferometer in which a reference mirror light blocking element 75 includes a small retractable light-blocking pad 75B on the end of a very thin slide rod 75A which extends through the housing of interferometer 2. When it is desired to use microscope 1 as an interference microscope, light-blocking element 75 can be withdrawn, as indicated by arrow 76, so that the light reflected from beamsplitter 2C reaches reference mirror 2A. However, when it is desirable to use microscope 1 as an ordinary microscope, element 75 can be retracted for the automatic focusing operation and then inserted to the left as indicated by arrow 76 to block light from reaching reference mirror 2A. the rod 75A needs to be thin enough to not interfere with ordinary visualization of sample surface 3 and pad 75B needs to be as small as possible. Alternately, pad 75B could have a tilted mirror surface thereon which deflects light off to the side where it does not interfere with ordinary visualization of sample surface 3. For some other types of interferometers, it would be practical to physically move reference mirror 2A out of the optical path to allow ordinary visualizing of the sample surface 3.

In an alternate embodiment of the invention, numeral 77 in FIG. 1 generally designates a proximity sensor which can be used. Proximity sensor 77 is capable of automatically detecting whether test surface 3 and X-Y stage 66 are too close to the microscope section 1A. In the event that proximity sensor 77 is utilized, the above-described coarse focus algorithm does not include rapidly moving microscope section 1A to a memory lock location, but instead includes rapid movement of microscope section 1A to a position at which proximity sensor 77 generates a signal 77A indicating that microscope section 1A is close enough to the test surface 3, and automatically stops movement of microscope section 1A.

Proximity sensor 77 may include a capacitive probe that indicates when the objective of the microscope section 1A is between the sample surface and the fringe window. Alternatively, proximity sensor 77 may include an inductive probe that is used to sense when the objective of the microscope section 1A is between the sample surface and the fringe window. A capacitive probe could be suitable in the specialized case in which test surface is metal.

Preferably, however, proximity sensor 77 includes additional optical elements used to automatically detect the position of microscope section 1A between sample surface 3 and the fringe window, with microscope section 1A moving at the same speed as in the coarse focusing algorithm described above. For example, FIG. 1A shows an implementation of such an optical technique, wherein a light source 78 produces an inclined beam 79 having a selected angle of incidence $\alpha_I$ to test surface 3, thereby producing a reflected beam 80 having an equal angle of reflection $\alpha_R$. Numeral 3A designates a relative location of sample surface 3 which is "too close" to microscope section 1A. Numeral 3B designates a relative location of sample surface 3 which is "too far" from the fringe window. A photodetector 81 is positioned such that the reflected beam 80 impinges thereon, producing signal 77A when microscope section 1A is lowered to a suitable initial starting point for the fine focus algorithm.

Dotted line 80A indicates a location of the reflected beam when microscope section 1A is too close to test surface 3A; in this case, the reflected beam 80A is too high, and does not impinge on detector 81. Dotted line 80B designates the location of reflected beam 80 when microscope section 1A is not close enough to test surface 3C; in this case, reflected beam 80B also does not impinge on detector 81. However, as soon as microscope section 1A moves close enough to test surface 3 that reflected beam 80 impinges on detector 81, signal 77A is generated, causing computer 30 to turn off motor 60, halting downward travel of microscope section 1A.

While the invention has been described with reference to several particular presently preferred embodiments thereof, those skilled in the art will be able to make the various modifications to the described embodiments of the invention without departing from the true spirit and scope of the invention.

What is claimed is:

1. A method of automatically focusing an optical instrument onto a sample surface, comprising the steps of:
   (a) moving an objective of the optical instrument to a position between the sample surface and a fringe window at a first speed by operating a position sensor to sense when the objective is a predetermined safe distance from the sample surface and turning off a motor moving the objective in response to such sensing;
   (b) moving the objective away from the sample surface at a second speed;
   (c) illuminating the sample surface with broad bank light through an interferometer in the optical instrument, splitting off a part of a resulting interference beam, and sensing intensities of the split off part of the interference beam by means of a first detector;
   (d) stopping movement of the objective in response to sensing of a change in a variable which is a function of sensed intensities, the change indicating presence of fringes in the interference beam;
   (e) moving the objective in the fringe window at a third speed, sensing a change in the variable, and recording values of the variable being produced in response to the first detector, and determining and storing a maximum value of the variable;
   (f) moving the objective in the fringe window at a fourth speed, sensing intensities of signals being produced by the first detector, and comparing corresponding values of the variable to the stored maximum value;
   (g) stopping the objective in response to the comparing when a value of the variable being produced by the first detector is equal to a preselected percentage of the maximum value.

2. The method of claim 1 including operating a capacitive probe to sense the position of the sample surface.

3. The method of claim 1 including operating an inductive probe to sense the position of the objective relative to the sample surface.

4. The method of claim 1 including producing a light beam incident at a selected angle to the sample surface, and detecting the presence of a resulting beam reflected from the sample surface by means of a detector when the objective is the selected distance from the sample surface, and turning off the motor in response to the detecting of the reflected beam.

5. An apparatus for automatically focusing an optical instrument onto a sample surface, comprising in combination:
   (a) an objective of the optical instrument;
   (b) means for moving the objective to a position between the sample surface and a fringe window at a first speed, wherein the moving means includes means for moving the objective of the optical instrument to the position between the sample surface and the fringe window by operating a position sensor to sense when the objective is a predetermined safe distance from the sample surface and means for turning off a motor moving the objective in response to such sensing when the objective is the predetermined safe distance from the sample surface;
   (c) means for moving the objective away from the sample surface at a second speed;
   (d) means for illuminating the sample surface with broad band light through an interferometer in the optical instrument, splitting off a part of a resulting interference beam;
   (e) a first detector;
   (f) means for sensing intensities of the split off part of the interference beam by means of the first detector;
   (g) means for stopping movement of the objective in response to sensing of a change in a variable which is a function of sensed intensities, the change indicating presence of fringes in the interference beam;
   (h) means for moving the objective in a fringe window at a third speed and sensing a resulting change in the variable;
   (i) means for recording values of the variable being produced in response to the first detector;
   (j) means for determining and storing a maximum value of the variable;
   (k) means for moving the objective in the fringe window at a fourth speed and sensing intensities of signals being produced by the first detector;
   (l) means for comparing corresponding values of the variable to the stored maximum value; and
   (m) means for stopping the objective in response to the comparing when a value of the variable being produced by the first detector is equal to a preselected percentage of the maximum value.

6. The apparatus of claim 5 including a capacitive probe positioned to sense the position of the sample surface.

7. The apparatus of claim 5 including an inductive probe positioned to sense the position of the objective relative to the sample surface.

8. The apparatus of claim 5 including means for producing a light beam incident at a selected angle to the sample surface, and detecting the presence of a resulting beam reflected from the sample surface by means of a detector when the objective is the selected distance from the sample surface, and means for turning off the motor in response to the detecting of the reflected beam.

9. A method of automatically focusing an optical instrument onto a sample surface, comprising the steps of:
   (a) moving an objective of the optical instrument to a position between the sample surface and a fringe window at a first speed;
   (b) moving the objective away from the sample surface at a second speed;
   (c) illuminating the sample surface with broad band light through an interferometer in the optical instrument, splitting off a part of a resulting interference beam, and sensing intensities of the split off part of the interference beam by means of a first detector;
   (d) stopping movement of the objective in response to sensing of a change in a variable which is a function of sensed intensities, the change indicating presence of fringes in the interference beam;
   (e) moving the objective in the fringe window at a third speed, sensing a change in the variable, and recording values of the variable being produced in response to the first detector, and determining and storing a maximum value of the variable;
   (f) moving the objective in the fringe window at a fourth speed, sensing intensities of signals being produced by the first detector, and comparing corresponding values of the variable to the stored maximum value;
   (g) stopping the objective in response to the comparing when a value of the variable being produced by the first detector is equal to a preselected percentage of the maximum value.

10. An apparatus for automatically focusing an optical instrument onto a sample surface, comprising in combination:
    (a) an objective of the optical instrument;
    (b) means for moving the objective to a position between the sample surface and a fringe window at a first speed;
    (c) means for moving the objective away from the sample surface at a second speed;
    (d) means for illuminating the sample surface with broad band light through an interferometer in the optical instrument, splitting off a part of a resulting interference beam;
    (e) a first detector;
    (f) means for sensing intensities of the split off part of the interference beam by means of the first detector;
    (g) means for stopping movement of the objective in response to sensing of a change in a variable which is a function of sensed intensities, the change indicating presence of fringes in the interference beam;
    (h) means for moving the objective in a fringe window at a third speed and sensing a resulting change in the variable;
    (i) means for recording values of the variable being produced in response to the first detector;
    (j) means for determining and storing a maximum value of the variable;
    (k) means for moving the objective in the fringe window at a fourth speed and sensing intensities of signals being produced by the first detector;
    (l) means for comparing corresponding values of the variable to the stored maximum value; and
    (m) means for stopping the objective in response to the comparing when a value of the variable being produced by the first detector is equal to a preselected percentage of the maximum value.

* * * * *